US006853981B1

(12) United States Patent
Radosevich et al.

(10) Patent No.: US 6,853,981 B1
(45) Date of Patent: Feb. 8, 2005

(54) METHOD AND SYSTEM FOR PROCESSING CUSTOMER REQUESTS AND GENERATING ASSOCIATED INFORMATION CORRELATED TO ORDERED PRODUCTS

(75) Inventors: Milton P. Radosevich, Peoria, IL (US); Jerry E. Brooks, Lowpoint, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/400,596

(22) Filed: Sep. 21, 1999

(51) Int. Cl.[7] .............................................. G06F 17/60
(52) U.S. Cl. ........................................ 705/27; 705/29
(58) Field of Search .............................. 705/26, 27, 28, 705/29, 22

(56) References Cited

U.S. PATENT DOCUMENTS

| | | | | |
|---|---|---|---|---|
| 3,732,544 A | * | 5/1973 | Obland | 700/236 |
| 4,459,663 A | | 7/1984 | Dye | |
| 4,656,591 A | | 4/1987 | Goldberg | |
| 5,233,533 A | * | 8/1993 | Edstrom et al. | 700/103 |
| 5,315,509 A | | 5/1994 | Natarajan | |
| 5,339,252 A | * | 8/1994 | White et al. | 12/146 L |
| 5,375,062 A | | 12/1994 | Aoki | |
| 5,450,317 A | | 9/1995 | Lu et al. | |
| 5,597,995 A | * | 1/1997 | Williams et al. | 235/375 |
| 5,666,493 A | | 9/1997 | Wojcik et al. | |
| 5,682,728 A | | 11/1997 | DeBusk et al. | |
| 5,727,164 A | | 3/1998 | Kaye et al. | |
| 5,758,329 A | | 5/1998 | Wojcik et al. | |
| 5,765,143 A | | 6/1998 | Sheldon et al. | |
| 5,794,213 A | | 8/1998 | Markman | |
| 5,797,515 A | * | 8/1998 | Liff et al. | 221/2 |
| 5,860,810 A | * | 1/1999 | Faul | 434/219 |
| 6,138,105 A | * | 10/2000 | Walker et al. | 235/378 |
| 6,198,980 B1 | * | 3/2001 | Costanza | 700/97 |
| 6,249,578 B1 | * | 6/2001 | Gilles et al. | 379/196 |
| 6,370,515 B1 | * | 4/2002 | Diamond et al. | 705/22 |
| 6,411,862 B1 | * | 6/2002 | Hazama et al. | 700/165 |

FOREIGN PATENT DOCUMENTS

| | | | |
|---|---|---|---|
| JP | 09163060 A | * | 12/1995 |
| JP | 11175642 A | * | 7/1999 |

OTHER PUBLICATIONS

Romano, Frank et al.; Digital Printing: Adding POD Services into Your Business; Seybold Seminars Boston/Publishing '99 Publishing Strategies Conference; Mar. 1, 1999; pp. 1–18.*

* cited by examiner

Primary Examiner—James S. McClellan
(74) Attorney, Agent, or Firm—Kevin M Kercher; Bryan McPherson

(57) ABSTRACT

A method and system for processing customer requests and generating associated information correlated to ordered products by utilizing at least one computing mechanism is disclosed. The method and system includes receiving multiple customer requests from at least one source, identifying at least one product from each customer request, identifying at least one specific subcomponent associated with each identified product, summing a quantity of identified products ordered from the customer requests, either determining when the summation of the identified products exceeds a predetermined value or when the duration of summation exceeds a predetermined time period, determining an appropriate output device, correlating information associated with each the identified product, and delivering the information to the appropriate output device for each identified product.

21 Claims, 5 Drawing Sheets

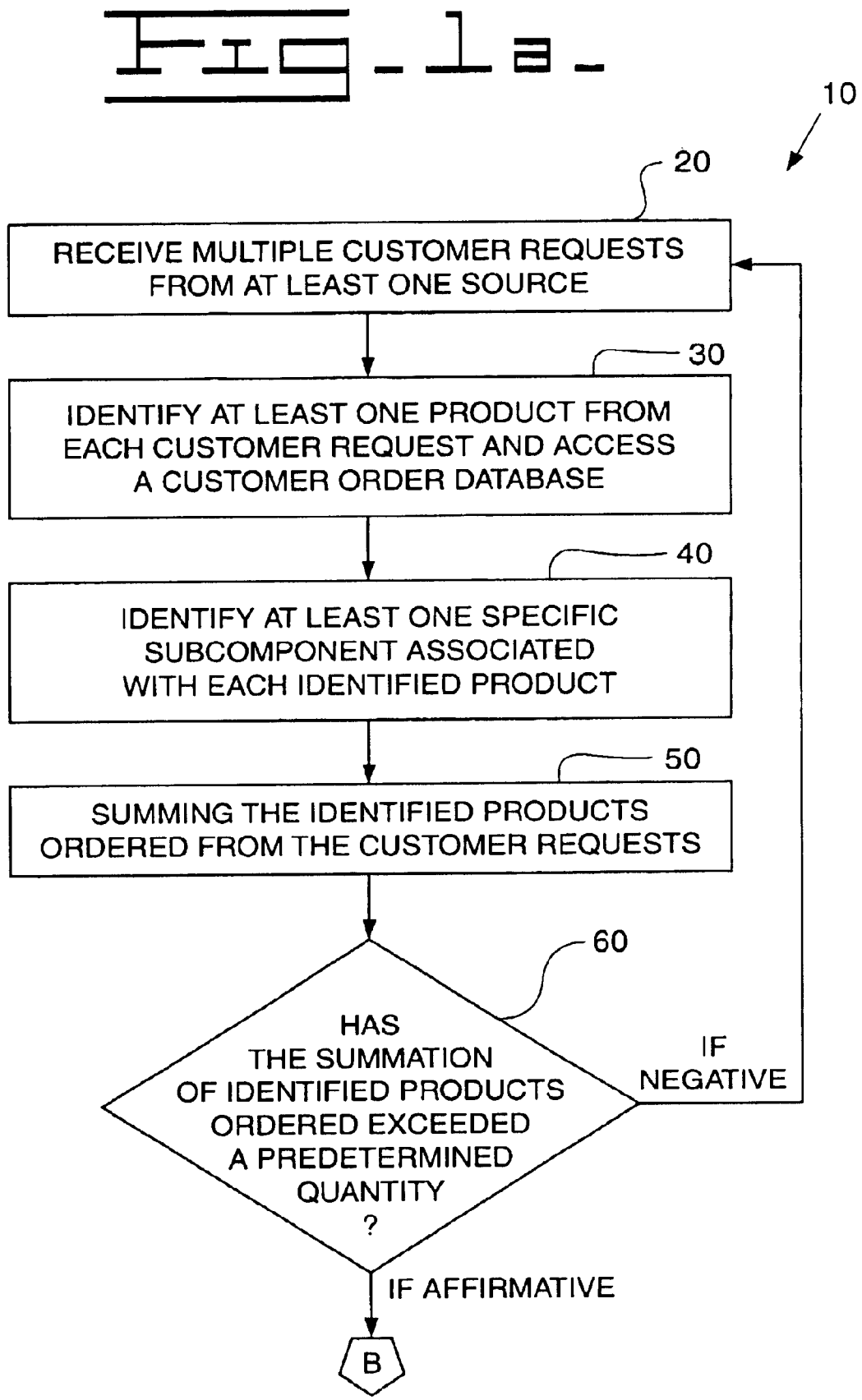

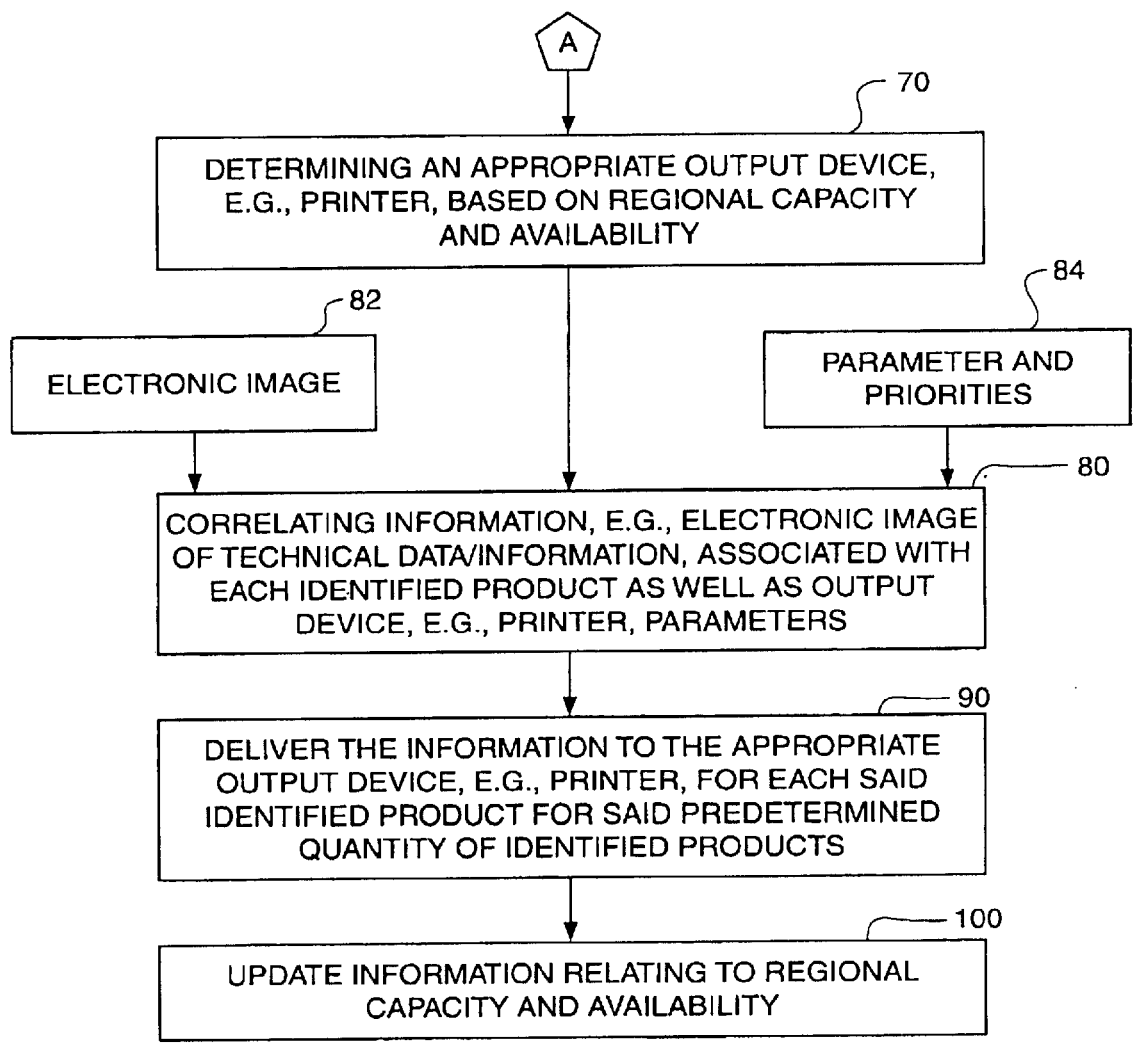

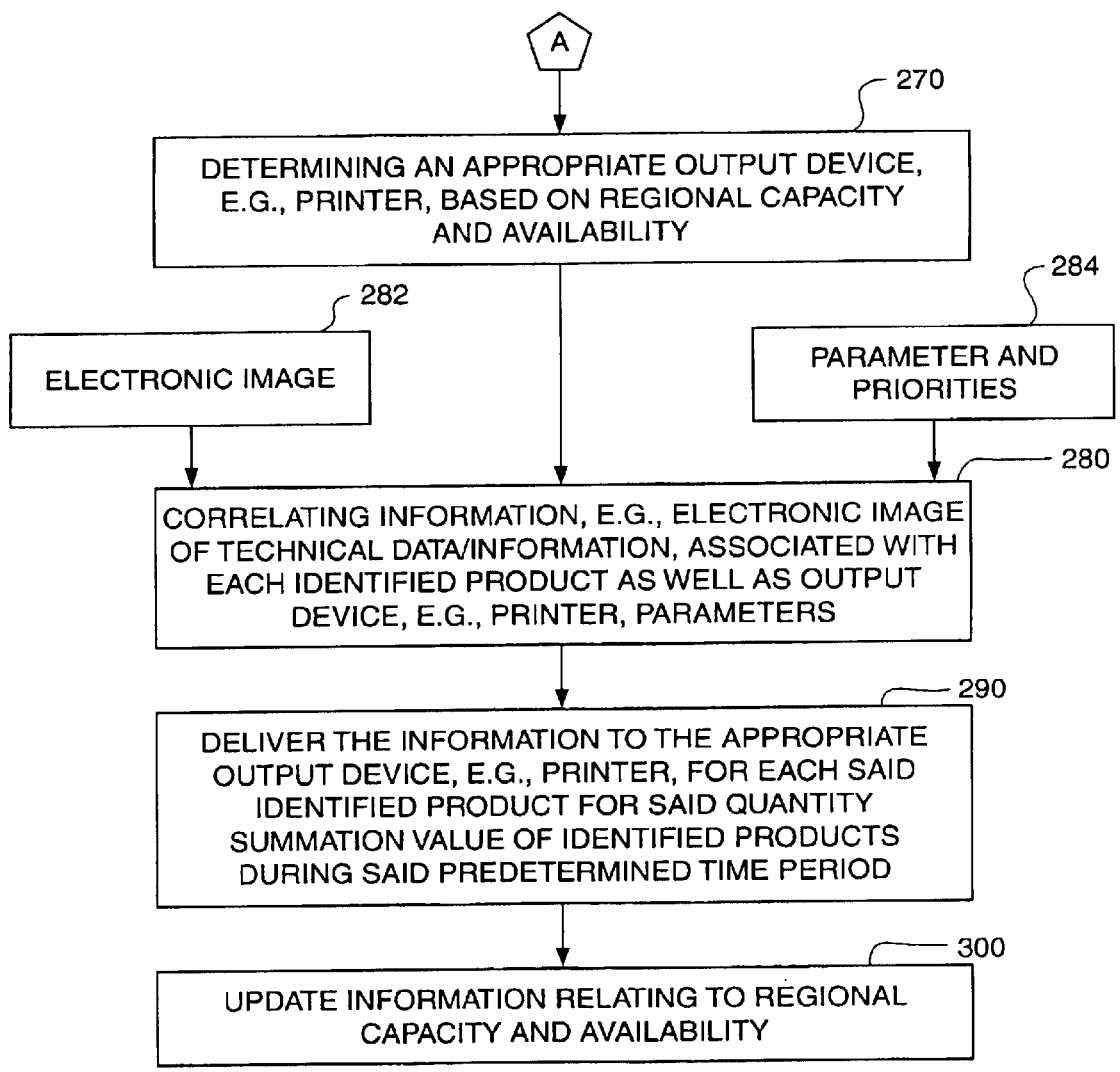

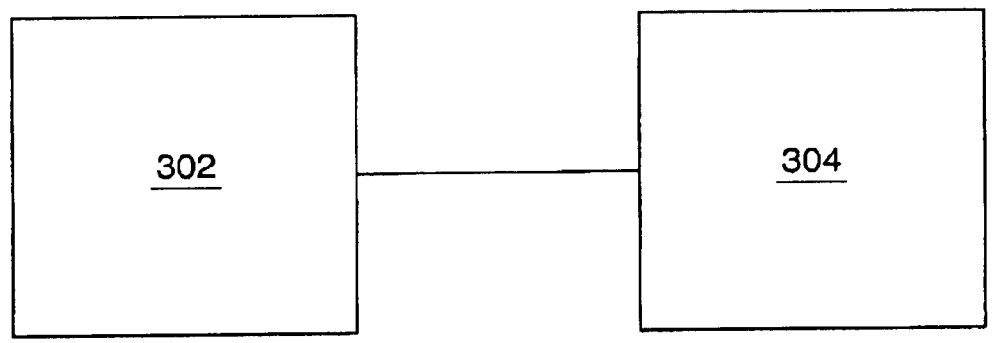
Fig_3_

METHOD AND SYSTEM FOR PROCESSING CUSTOMER REQUESTS AND GENERATING ASSOCIATED INFORMATION CORRELATED TO ORDERED PRODUCTS

TECHNICAL FIELD

This invention relates generally to a method and system of fulfilling customer orders and, more particularly, to a method and system for processing customer requests and generating associated information correlated to ordered products.

BACKGROUND ART

In general, the receipt of multiple customer orders from a variety of sources can make the task of manufacturing products with associated technical documentation extremely burdensome. Typically, technical information associated with manufactured products are printed far in advance of a sale in large quantities. If there is need to make even a minor change to the technical information, the entire quantity of printed material must be thrown out. In addition, this documentation must to stored in a safe, dry place at a considerable cost and expense. For a global enterprise, this documentation must be already printed in numerous languages and then shipped to the location where the product is sold.

Another major complication arising from the receipt of multiple customer orders from a variety of sources is the inability to maximize manufacturing productivity by minimizing setups, optimizing shop floor activities, and so forth.

The present invention is directed to overcoming one or more of the problems set forth above.

DISCLOSURE OF THE INVENTION

In one aspect of this invention, a method for processing customer requests and generating associated information correlated to ordered products by utilizing at least one computing mechanism is disclosed. The method includes the steps of receiving multiple customer requests from at least one source, identifying at least one product from each customer request, identifying at least one specific subcomponent associated with each identified product, summing a quantity of the identified products ordered from the customer requests, determining when the summation of the identified products exceeds a predetermined value, determining an appropriate output device, correlating information associated with each identified product, and delivering the information to the appropriate output device for each identified product for the predetermined quantity of identified products.

In another aspect of this invention, a system for processing customer requests and generating associated information correlated to ordered products is disclosed. The system includes at least one computing mechanism for receiving multiple customer requests from at least one source, identifying at least one product from each customer request, summing a quantity for each identified product ordered from the customer requests, determining when the quantity for each identified product exceeds a predetermined value, determining an appropriate output device, and correlating information associated with each identified product, and at least one output device for outputting the information for each identified product for the predetermined quantity of identified products.

BRIEF DESCRIPTION OF THE DRAWINGS

For a better understanding of the present invention, reference may be made to the accompanying drawings in which:

FIG. 1 is a flowchart of the present invention illustrating a method and system for processing customer requests and generating associated information correlated to a predetermined quantity of ordered products by utilizing at least one computing mechanism;

FIG. 3 is an illustration of one embodiment of a system configured to process customer requests and generate associated technical information correlated to the ordered products.

BEST MODE FOR CARRYING OUT THE INVENTION

Figure 2A:
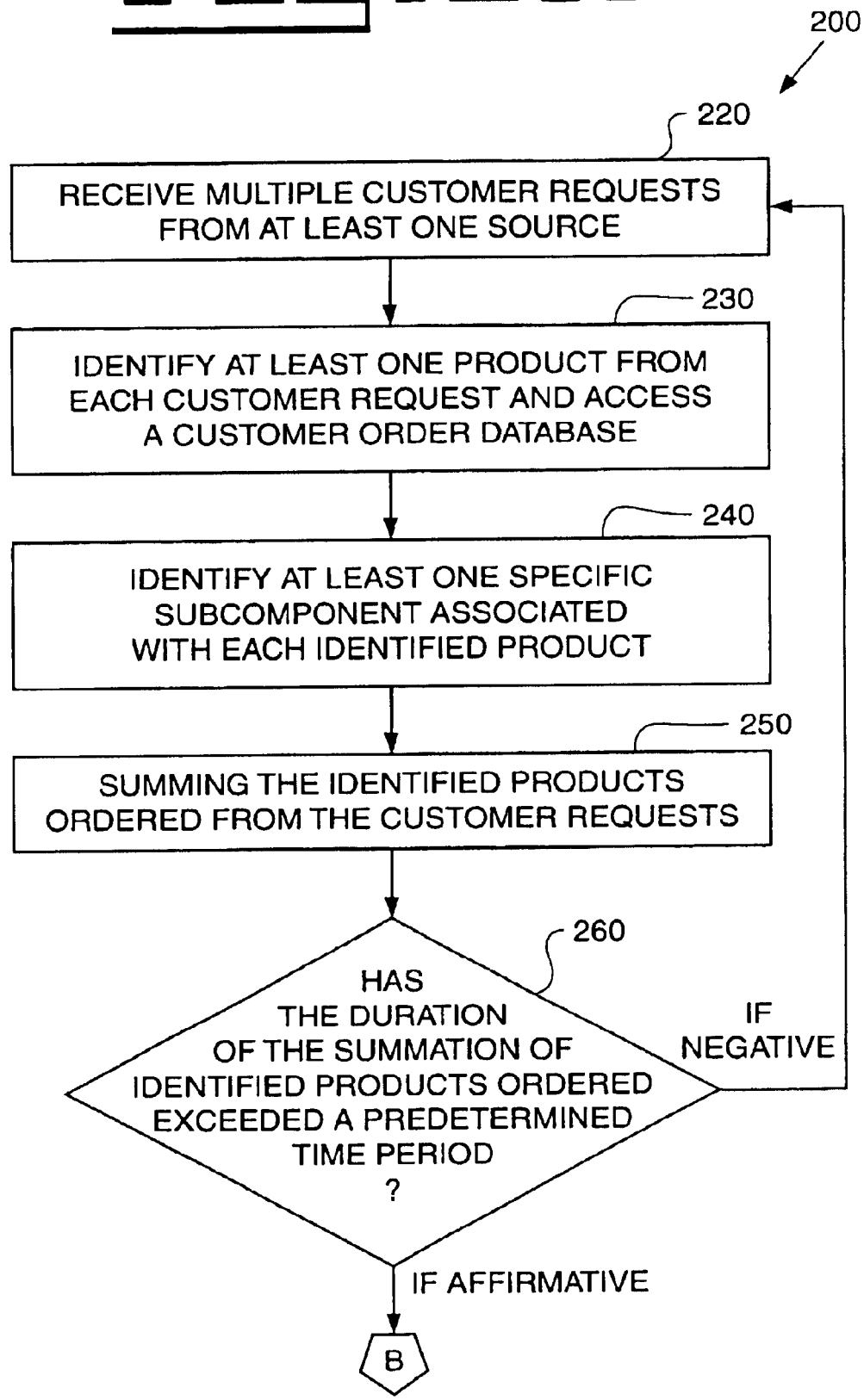
FIG. 2 is a flowchart illustrating a method and system of an alternative embodiment of the present invention for processing customer requests received during a predetermined time period and generating associated information correlated to ordered products by utilizing at least one computing mechanism.

Referring now to the drawings, and initially to FIG. 1, which depicts a flowchart representative of the method and system for processing customer requests and generating associated information correlated to ordered products and is denoted generally by reference numeral 10. There is at least one electronic computing mechanism 302 and at least one output device 304 used in the present invention, as illustrated in FIG. 3, although there is a myriad of combinations of both electronic computing mechanisms and output devices that can be utilized. The electronic computing mechanism preferably, but not necessarily, can include a mainframe computer, however, any of a wide variety of computing devices will suffice such as a microprocessor. The output device is preferably, but not necessarily, a printer, however any of a wide variety of output devices will suffice such as displays and storage devices. An optimal printer would a color laser printer, however, any of a wide variety of printers will suffice.

A programmer skilled in the art could utilize this flowchart to program any of a wide variety of electronic computing mechanisms in a wide variety of programming languages. In the description of the flowcharts, the functional explanation marked with numerals in angle brackets, <nnn>, will refer to the flowchart blocks bearing that number.

The first step in the process involves receiving multiple customer requests, otherwise known as orders, from at least one source <20>. The second process step involves identifying at least one product from each customer request and accessing a customer order database for associated information related to each product <30>. Preferably, but not necessarily, all products are identified with each customer request. A product is defined as an item that is sold to the customer as a marketable unit that typically has technical information associated with it.

The third process step <40> is to identify at least one subcomponent associated with each of the products identified in process step <30>. Preferably, but not necessarily, all of the subcomponents are identified with each and every product and this information is typically utilized for the manufacturing and marketing of the products, which can include the casting, machining, assembly, inventory, ordering, among numerous other functions and operations. Process step <40> can occur at any point in the process and is not limited to the third process step.

The fourth process step <50> is to sum the products previously identified in process step <30> from the multiple customer requests identified in process step <20>. Preferably, but not necessarily, all products that are identified with each customer request are summed.

The fifth process step <60> is to determine when the summation of the identified products from process step <50> exceeds a predetermined quantity. This predetermined quantity can vary tremendously depending on the particular product, market, demand, and so forth. If the response to the query is negative, the process returns to process step <20> to receive more customer requests. If the response to the query is positive, the process will proceed to the next process step.

The sixth process step <70> involves the determination of an appropriate output device. This depends on regional capacity and availability.

The seventh process step <80> is to correlate technical information or data with the products identified in process step <30>. This technical information or data is typically, but not necessarily, related to the product such as a technical operating and repair manual for that specific product. This technical information or data is typically and optionally in the form of an electronic image <82>. In addition to the predetermined quantity and electronic image, there are numerous output device parameters and priorities that may be associated with each product <84>. In addition, process step <70> can occur after process step <80>.

Finally, in the eighth process step <90>, the electronic image of the technical information or data for each identified product is delivered to the appropriate output device, e.g., laser printer. The predetermined quantity of each identified product, as determined in process step <60>, is outputted or printed.

This provides a tremendous advantage over previous printing methods since you can have an electronic image of the technical information or data in virtually any language desired. This eliminates the storage of vast quantities of printed material. In addition, the regional printer can be located in any country desired so that printed material will not need to be shipped through customs at a considerable cost and expense. Furthermore, the electronic image can be changed or modified at a moment's notice to allow for technical changes or rectification of errors.

A last and optional process step <100>, provides an update of the information relating to regional output device capacity and availability ascertained in process step <70>. This process is continuously repeated if desired.

Turning now to FIG. 2, there is a flowchart depicted that is representative of an alternative =embodiment of the method and system for processing customer requests and generating associated information correlated to ordered products and is denoted generally by reference numeral 200.

The first step in the process involves receiving multiple customer requests, otherwise known as orders, from at least one source <220>. The second step involves identifying at least one product from each customer request and accessing a customer order database for associated information related to each product <230>. Preferably, but not necessarily, all products are identified with each customer request. A product is defined as an item that is sold to the customer as a marketable unit that typically has technical information associated with it.

The third process step <240> is to identify at least one subcomponent associated with each of the products identified in process step <230>. Preferably, but not necessarily, all of the subcomponents are identified with each and every product and this information is typically utilized for the manufacturing and marketing of the products, which can include the casting, machining, assembly, inventory, ordering, among others. This process step <240> can occur at any point within the process.

The fourth process step <250> is to sum the products previously identified in process step <230> from the multiple customer request identified in process step <220>. Preferably, but not necessarily, all products that are identified with each customer request are summed.

The fifth process step <260> is to determine if the duration of the summation from process step <250> has exceeded a predetermined time period. This predetermined time period can vary tremendously depending on the particular product, market, demand, and so forth. If the response to the query is negative, the process returns to process step <220> to receive more customer requests. If the response to the query is positive, the process will proceed to the next process step.

The sixth process step <270> involves the determination of an appropriate output device. This depends on regional capacity and availability.

The seventh process step <280> is to correlate technical information or data with the products identified in process step <230>. This technical information or data is typically, but not necessarily related to the product such as a technical operating and repair manual for that specific product. This technical information or data is typically and optionally in the form of an electronic image <282>. In addition to the predetermined quantity and electronic image, there are numerous output device parameters and priorities that may be associated with each product <284>. Process step <270> can occur after process step <280>.

Finally, with the eighth process step <290>, the electronic image of the technical information or data is delivered to the appropriate output device, e.g., laser printer. The summation value of quantity of the identified products as determined in process step <260> during the predetermined time period is outputted or printed.

This provides a tremendous advantage over previous printing methods since you can have an electronic image of the technical information or data in virtually any language desired. This eliminates the storage of vast quantities of printed material. In addition, the regional printer can be located in any country desired so that printed material will not need to be shipped through customs at a considerable cost and expense. Furthermore, the electronic image can be changed or modified at a moment's notice to allow for technical changes or rectification of errors.

A last and optional process step <300>, provides an update of the information relating to regional output device capacity and availability ascertained in process step <270>. This process is continuously repeated if desired.

Industrial Applicability

The present invention is advantageously applicable in printing technical manuals for manufactured products all over the world.

The following description is only for the purposes of illustration and is not intended to limit the present invention as such. It will be recognizable, by those skilled in the art, that the present invention is suitable for a plurality of other applications. Initially, customer requests or work orders are received with, preferably, but not necessarily, each of the products identified. Then, preferably, but not necessarily, each of the products are broken down into subcomponents and this information is utilized in the manufacturing process to optimize shop floor activities, minimize setups, and to order raw materials, as well as numerous other activities. The products are then summed and a determination is made as to whether or not the summation exceeds a predetermined value or whether a predetermined time period has lapsed.

The appropriate output device, e.g., laser printer, is then determined along with associated regional capacity and availability. There is then a correlation of an electronic image of technical data or information correlated with each product. This is preferably a technical manual. In addition, various output device parameters and priorities and also correlated to the information. All of this correlated information is then delivered to the appropriate regional output device, e.g. printer, for outputting either the predetermined quantity of technical manuals or the quantity of products summed during the predetermined time period. Optionally, the information relating to regional output device capacity and availability is updated. The technical manual is capable of being outputted in any desired language and can be revised instantaneously at any time. No unnecessary technical manuals need to be printed.

In view of the foregoing, it is readily apparent that the subject method for processing customer requests and generating associated information that is correlated to ordered products provides significant advantages over traditional printing methods involving the production of batches of information that must be stored and shipped.

Other aspects, objects and advantages of the present invention can be obtained from a study of the drawings, the disclosure and the appended claims.

What is claimed is:

1. A method for processing customer requests and generating associated information correlated to ordered products by utilizing at least one computing mechanism, said method comprising the steps of:

receiving multiple customer requests from at least one source;

identifying at least one product from each said customer request;

summing a quantity of said identified products from said customer requests;

determining a value for said summation of quantity for said identified products during a predetermined time period;

determining an appropriate output device;

correlating technical information associated with each said identified product, said technical information including a repair manual; and delivering said technical information to said appropriate output device for each said identified product for said quantity summation value of identified products during said predetermined time period; and said output device is a printer.

2. The method of claim 1, wherein said output device includes a plurality of printers located at different physical locations.

3. The method of claim 1, wherein said information includes an electronic image.

4. The method of claim 1, wherein said technical information includes a technical manual.

5. The method of claim 1, wherein said technical information includes a technical operating manual.

6. The method of 1, further comprising the step of identifying a plurality of different subcomponents associated with at least one of said identified product.

7. The method of claim 6, wherein said technical information is associated with said plurality of different subcomponents.

8. A system for processing customer requests and generating associated information correlated to ordered products comprising:

at least one computing mechanism for receiving multiple customer requests from at least one source, identifying at least one product from each said customer request, summing a quantity for each said identified product ordered from said customer requests, determining a value for said summation of quantity for said identified products during a predetermined time period, determining an appropriate output device, and correlating technical information associated with each said identified product, said technical information including a repair manual; and at least one output device for outputting said technical information for each said identified product for said quantity summation value of identified products during said predetermined time period; and said output device is a printer.

9. The method of claim 8, wherein said output device includes a plurality of printers located at different physical locations.

10. The method of claim 8, wherein said information includes an electronic image.

11. The system of claim 8, wherein said technical information includes a technical manual.

12. The system of claim 8, wherein said computing mechanism is further configured to identify at least one specific subcomponent associated with at least one of said identified product.

13. The system of claim 8, wherein said technical information is associated with a plurality of different subcomponents of said product.

14. A method for processing customer requests and generating associated information correlated to ordered products by utilizing at least one computing mechanism, said method comprising the steps of:

receiving multiple customer requests from at least one source;

identifying at least one product from each said customer request;

summing a quantity of said identified products from said customer requests;

determining a threshold associated with said summing quantity, said threshold including one of a predetermined time period and a predetermined value;

determining a value for said summation of quantity for said identified products;

determining an appropriate output device based on a geographic location and a regional capacity of said output device;

correlating technical information associated with each said identified product, said technical information including at least one of a technical operating manual and a repair manual; and delivering said technical information to said appropriate output device for each said identified product for said quantity summation value of identified products upon exceeding said threshold.

15. The method of claim 14, wherein said technical information includes a technical manual.

16. The method of claim 14, further comprising the step of identifying at least one specific subcomponent associated with at least one of said identified product.

17. The method of claim 16, wherein said technical information is associated with said specific subcomponent.

18. A system for processing customer requests and generating associated information correlated to ordered products comprising:

at least one computing mechanism for receiving multiple customer requests from at least one source, identifying at least one product from each said customer request, summing a quantity for each said identified product ordered from said customer requests, determining a threshold associated with said summing quantity, said threshold including one of a predetermined time period and a predetermined value, determining a value for said summation of quantity for said identified products during a predetermined time period, determining an appropriate output device based on a geographic location and a regional capacity of said output device, and correlating technical information associated with each said identified product, said technical information including at least one of a technical operating manual and a repair manual; and at least one output device for outputting said technical information for each said identified product for said quantity summation value of identified products upon exceeding said threshold.

19. The system of claim 18, wherein said technical information includes a technical manual.

20. The system of claim 18, wherein said computing mechanism is further configured to identify at least one specific subcomponent associated with at least one of said identified product.

21. The system of claim 18, wherein said technical information is associated with said specific subcomponent.

* * * * *